Aug. 17, 1937.                R. DI SABATINO                2,090,010
                       ROTARY INVERTER AND RECTIFIER
                            Filed July 13, 1933
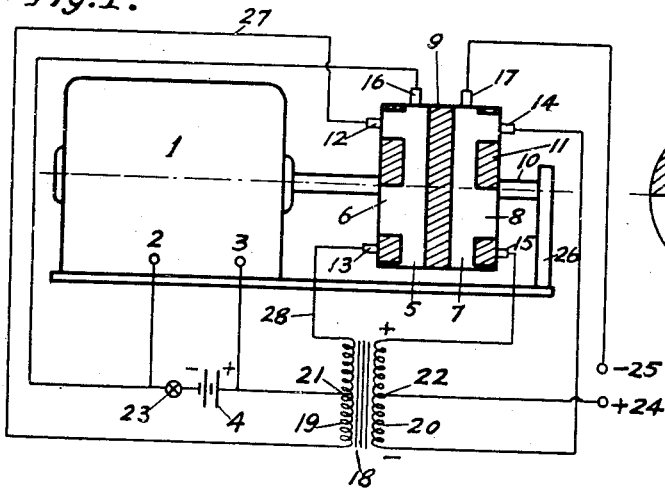
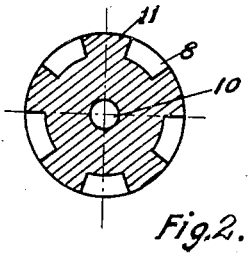
Fig.1.  Fig.2.
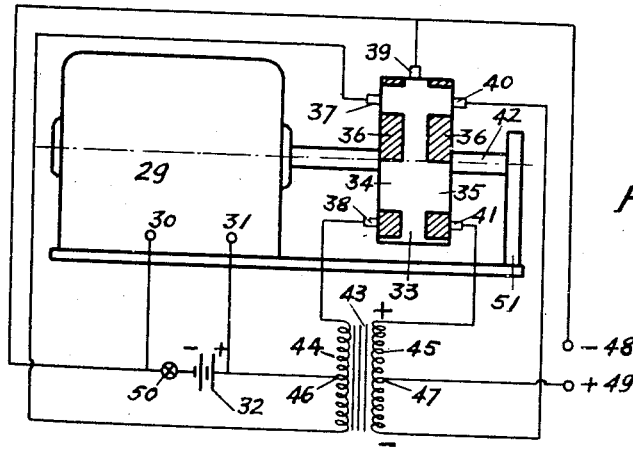
Fig.3.
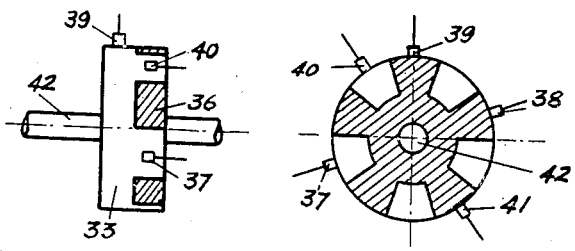
Fig.4.  Fig.5.
INVENTOR.
Roland Di Sabatino.
BY
ATTORNEYS Patented Aug. 17, 1937

2,090,010

UNITED STATES PATENT OFFICE 2,090,010

ROTARY INVERTER AND RECTIFIER

Roland Di Sabatino, Philadelphia, Pa., assignor, by mesne assignments, to Larner Machine Company, Philadelphia, Pa., a corporation of Delaware Application July 13, 1933, Serial No. 680,205

4 Claims. (Cl. 171—123)

The present invention relates to a rotary inverter and rectifier, the object of which is to provide a means for obtaining any desired uni-directional voltage from a uni-directional voltage source, and particularly for obtaining a uni-directional voltage higher than the uni-directional voltage of the source.

Heretofore high uni-directional voltages have been obtained from low uni-directional voltage sources in several ways, including the use of a vibrating reed for interrupting the low uni-directional voltage to permit its transformation to a higher alternating voltage by means of an ordinary transformer, and the usual means for rectifying this high alternating voltage to obtain a high uni-directional voltage. Such methods have the disadvantages of mechanical instability, poor wave form, limitations to the frequency of interruption, and relatively short life. They have been used chiefly because of their economical construction. In my invention I accomplish the object of obtaining a high uni-directional voltage from a low uni-directional voltage in such a way as to have high mechanical stability, highly improved wave form, wide range of possible frequencies of interruption, and long life.

The attainment of the object of my invention, namely the obtaining of high uni-directional voltages from low uni-directional voltage sources in an efficient and simple manner, will be apparent from the following description read in conjunction with the accompanying drawing in which:

Fig. 1 is a diagrammatic view of one modification of a rotary inverter and rectifier embodying my invention;

Fig. 2 is a view of the ring 7 of Fig. 1 taken perpendicular to the axis of the shaft 10 of Fig. 1;

Figs. 3 and 4 are diagrammatic views of further modifications of a rotary inverter and rectifier embodying my invention;

Fig. 5 is a view of the ring 33 of Fig. 4 taken perpendicular to the axis of the shaft 42 of Fig. 4.

Fig. 1 is a diagrammatic view of one modification of a rotary inverter and rectifier embodying my invention. 1 is a motor whose terminals 2 and 3 are connected to the same source whose E. M. F. it is desired to change. 1 may be any other convenient source of mechanical power. The two metallic rings 5 and 7, have the projections 6 and 8 respectively. Fig. 2 shows a view of one of these rings taken perpendicularly to the axis of the shaft 10. The rings are rigidly mounted on the shaft 10 (and electrically insulated therefrom), which shaft may be either an extension of the shaft of the motor 1, as shown, or may be mechanically coupled to the shaft of the motor. The rings 5 and 7 are electrically insulated from each other in any suitable manner as for example by means of an insulating spacer 9. The spaces between the projections 6, and the spaces between the projections 8 are both filled with an insulating material 11, so as to present a continuous surface to the brushes 12, 13, 14 and 15. Rings and insulation are rigidly mounted on the shaft 10 and the rotation of the motor 1 therefore causes the rotation of the ring assembly.

Contact to the continuous portion of the ring 5 is made by means of the fixed brush 16; and contact to the ring 7 is made by means of the fixed brush 17. Contact to the segmented ring formed by the projections 6 and the insulation 11 is made by means of the two fixed brushes 12 and 13, which are so located that when brush 12 is over the center of one of the projections 6, the brush 13 is over the center of one of the spaces between these projections. Contact to the segmented ring formed by the projections 8 and the insulation 11 is made by means of the two fixed brushes 14 and 15, which are so located that when brush 14 is over the center of one of the projections 8, brush 15 is over the center of one of the spaces between these projections. Moreover the pair of brushes 14 and 15 is so located with respect to the pair of brushes 12 and 13, that when 12 and 13 are over the centers of their respective segments, 14 and 15 are over the centers of their respective segments.

The two ends of the low voltage winding 19 of the transformer 18 are electrically connected to the brushes 12 and 13 by means of suitable electrical conductors 27 and 28. The two ends of the high voltage winding 20 of the transformer 18 are connected to the brushes 14 and 15. One terminal of the source 4 is connected to the center tap 21 of the winding 19, and the other terminal of the source 4 is connected to the brush 16. A switch 23 is provided for disconnecting the source 4 from the inverter-rectifier. The center tap 22 of the winding 20 is connected to the terminal 24, and the brush 17 is connected to the terminal 25. 26 is a support for the bearing for the shaft 10, the other bearing being supplied by the motor 1. The operation of the inverter-rectifier shown in Fig. 1 is as follows.

The source 4 is caused to supply power by closing with switch 23. This causes the motor 1 to rotate and applies the voltage of the source 4 between the center tap 21 of the winding 19 and the brush 16. If the polarity of the source is as indicated in Fig. 1, then the center tap 21 of the winding 19 will be positive, and the brush 16 (and hence the ring 5 and the projections 6) will be negative. Consider the instant when the position of the rings is as indicated in Fig. 1. In this case brush 12 is in contact with a projection 6 and hence will be negative. Brush 13 is insulated from the rings. Hence there will be a flow of electric current through one half of the winding 19, and a magnetic flux is established which links both windings 19 and 20. As the motor rotates, the brush 12 will become insulated, and brush 13 will make contact with a projection 6. At that time current will flow through the other half of the winding 19 and again establish a magnetic flux which links both windings 19 and 20. Since the center tap 21 is always positive, the flux established by current flowing through one half of the winding 19 is opposite in direction to the flux established by current flowing through the other half of the winding 19. Hence as the flow of current changes from one half of the winding 19 to the other half, due to the rotation of the motor as described, the flux linking the two windings 19 and 20 reverses in direction. This reversal occurs every time the segment with which the brush 12 is in contact, changes from a conducting segment 6 to an insulating segment 11, and/or from an insulating segment 11 to a conducting segment 6. Therefore the magnetic flux executes a complete cycle as the segment in contact with the brush 12 changes from a conducting segment 6 to the next conducting segment 6, or from an insulating segment 11 to the next insulating segment 11. Hence if there are $m$ conducting segments 6, and the speed of the motor is $n$ revolutions per second, there will be established in the transformer 18 an alternating flux having a frequency of $mn$ cycles per second. There will thus be transformer action, and if the winding 20 has a greater number of turns than winding 19, the alternating voltage induced in winding 20 will be greater than the voltage applied to the winding 19.

Due to the connections described, this higher alternating voltage is applied to the brushes 14 and 15. Suppose that the relative directions of the windings 19 and 20 are such that the polarity of the winding 20 at the instant indicated in Fig. 1 is as shown. In this case brush 15 is on an insulating segment 11 and is inactive. Brush 14 makes contact with one of the segments 8, and since it is negative, it causes the segment 8, the ring 7, the brush 17, and the terminal 25 to be negative. The center tap 22 is positive with respect to the brush 14, and hence terminal 24 is positive with respect to terminal 25. As the motor rotates and reverses the direction of the flux in the transformer 18, as described, the brush 14 becomes positive and the brush 15 negative. At the same time the segment in contact with the brush 14 changes to an insulating segment 11, and the segment in contact with the brush 15 changes to a conducting segment 8. The ring 7, brush 17, and terminal 25, will thus again be negative, and since the center tap 22 is now positive with respect to the brush 15, terminal 24 will again be positive with respect to the terminal 25. There will thus exist a high uni-directional difference of potential between terminals 24 and 25, which may be either directly utilized, or filtered by means of the well known electric low pass wave filter.

Fig. 3 is a diagrammatic view of another modification embodying my invention. 29 is a motor whose terminals are connected to any suitable source of electric power. In this case the terminals 31 and 30 are connected to the same source of uni-directional voltage 32, whose voltage it is desired to change. 29 may be any other convenient source of mechanical power. A metallic ring 33, with projections 34 and 35, is rigidly mounted on the shaft 42, and electrically insulated therefrom. This shaft may either be integral with the motor shaft (as shown), or may be a separate shaft suitably coupled to the motor shaft. The spaces between the segments 34, and the spaces between the segments 35, are filled with insulating material 36 in such a way that a continuous surface is presented to the brushes 37, 38, 40 and 41. Electrical contact to the segments 34 is made by means of two fixed brushes 37 and 38 which are so located that when 37 is in contact with a conducting segment 34, 38 is in contact with an insulating segment 36. Electrical contact to the segments 35 is made by means of the two fixed brushes 40 and 41, which are so located that when 40 is in contact with a conducting segment 35, 41 is in contact with an insulating segment 36. Electrical contact to the continuous portion of the ring 33 is made by means of the fixed brush 39.

The two ends of the low voltage winding 44 of the transformer 43 are connected, by means of suitable electrical conductors, to the brushes 37 and 38. The two ends of the high voltage winding 45 are similarly connected to the two brushes 40 and 41. The center tap 46 of the winding 44 is similarly connected to one terminal of the source 32. The other terminal of the source 32 is similarly connected both to the brush 39, and to the terminal 48. The center tap 47 of the winding 45 is similarly connected to the terminal 49. A switch 50 is provided for disconnecting the source 32 from the inverter rectifier. The operation of this form of my invention is as follows.

The switch 50 is closed so as to permit the flow of current from the source 32. This causes the motor 29 to rotate. At the same time it causes the voltage of the source 32 to be applied between the center tap 46 of the winding 44, and the brush 39. Assuming the polarity of the source to be as shown, the center tap 46 will be positive, and the brush 39 and the terminal 48 will be negative. The metallic ring 33 will thus always be negative with respect to the center tap 46. When the position of the ring is as shown in Fig. 3, the brush 39, and hence the end of the winding 44 to which it is connected through brush 37, is negative, and current will flow in one half of the winding 44. This current will set up a magnetic flux in transformer 43 which will link both windings 44 and 45. As the ring rotates, the segment in contact with the brush 37 will change to an insulating segment 36, and the segment in contact with the brush 38 will change to a conducting segment 34. This causes the current already flowing to cease, and by making the brush 38 negative with respect to the center tap 46, causes the current to flow in the other half of the winding 44. As before, a magnetic flux linking 44 and 45 will again be established. Inasmuch, however, as the center tap 46 is always positive with respect to the other end of that half of the winding 44 in which current is flowing, the flux set up by the current in one half of the winding 44 is opposite in direction to the flux set up by the current in the other half of the same winding. Hence as the current changes from one half of the winding 44 to the other half, due to rotation of the ring, the flux reverses its direction. Such a reversal occurs every time the segment under brush 37 changes from a conducting segment 34 to an insulating segment 36, or vice versa. The flux will therefore undergo a complete cycle every time the segment under 37 changes from a conducting segment 34 to the next conducting segment 34, os from an insulating segment 36 to the next insulating segment 36. Thus if there are $m$ conducting segments, the flux undergoes $m$ complete cycles per revolution, and if the speed of the motor 29 is $n$ revolutions per second, the alternating flux established in the transformer 43 will have a frequency of $nm$ cycles per second.

Due to ordinary transformer action, this alternating flux will induce a corresponding alternating voltage in the high voltage winding 45, and if the number of turns in 45 is greater than the number of turns in 44, the voltage in the secondary winding 45 will be higher than the voltage applied on 44. This induced high voltage will exist between the brushes 40 and 41. Suppose that the relative directions of the windings 44 and 45 are such that at the instant indicated in Fig. 3 the polarity of the induced voltage is as shown. Then brush 40 is negative with respect to brush 41. In this case the center tap 47 is positive with respect to brush 40; and since brush 40 is making contact with the ring 33, it is at the same potential as the terminal 48 because of the connections described. The center tap 47, and hence the terminal 49, will be positive with respect to the terminal 48, and between the terminals 48 and 49 will exist a voltage equal to the voltage induced in one half of the winding 45. As the ring 33 rotates, it causes the reversal of the flux in transformer 43, as described, and therefore of the polarity of the voltage induced in 45. The brush 40 will now become positive, and brush 41 negative. This same rotation, however, simultaneously causes the segment under 40 to change to an insulating segment 36, and the segment under 41 to change to a conducting segment 35. The ring 33 will thus again be negative with respect to the center tap 47. Therefore terminal 48 will again be negative with respect to the terminal 49. There will thus exist between terminals 48 and 49 a unidirectional difference of potential which may either be utilized directly, or may be filtered in the usual manner by means of the well known electric low pass wave filter.

An alternate form of the ring 33 (of Fig. 3) with its projecting segments, is shown in Figs. 4 and 5, Fig. 4 being a diagrammatic axial view, and Fig. 5 being a view taken perpendicularly to the axis of the shaft 42. Instead of having a set of projections on either side of the ring, a single set of projections, and on one side only, is provided, as shown in Fig. 4. Since the projections 34, in Fig. 3, are at the same potential as the projections 35, this change in no way affects the operation of the unit, but merely involves placing the brushes 37 and 38 on the same side of the ring 33, as the brushes 40 and 41, as indicated in Figs. 4 and 5. The rest of the circuit, and the connections to the brushes, as well as the operation of the inverter rectifier, remain absolutely and identically the same and unchanged, and are the same as described for Fig. 3.

It is obvious that minor modifications may be made in the above descriptions without departing from the spirit of my invention. All of the above forms of my invention involve two steps—the changing of a unidirectional voltage into an alternating voltage, and the changing of this alternating voltage into a unidirectional voltage. Furthermore the above descriptions have all been given on the assumption of a load current in phase with the primary alternating voltage applied to the primary of the transformer, this being the most usual case. If however, due to any difference in phase it is found necessary to adjust the time of reversal of the secondary connections with respect to that of the reversal of the primary connections, to avoid such undesirable effects as sparking, this may be accomplished very easily, in all the forms of my invention, by displacing the pair of brushes connecting to the secondary winding with respect to the pair of brushes connecting to the primary winding. These adjustments permit the use of any type of impedance load.

What I claim and desire to protect by Letters Patent is:

1. In combination with a source of unidirectional voltage, a transformer having primary and secondary windings, each provided with an intermediate tap; means continuously connecting one terminal of the source to the intermediate primary tap; means for alternately connecting the terminals of the primary winding to the other terminal of the source, the last named means comprising a rotating set of electrically connected commutator segments, means continuously joining the last named terminal of the source to the segments, and a pair of brushes connected to the terminals of the primary winding and alternately engageable by the commutator segments; and means for rectifying the secondary output comprising a second rotating set of electrically connected commutator segments electrically connected to the first set, and a pair of brushes connected to the terminals of the secondary winding and alternately engageable by the commutator segments, the commutator segments engaging the last named brushes in timed relationship with the alternations of primary current flow whereby a full wave rectified voltage is obtained between the last named commutator segments and the intermediate secondary tap.

2. In combination with a source of unidirectional voltage, a transformer having primary and secondary windings, each provided with an intermediate tap; means continuously connecting one terminal of the source to the intermediate primary tap; means for alternately connecting the terminals of the primary winding to the other terminal of the source, the last named means comprising a rotating set of electrically connected commutator segments, means continuously joining the last named terminal of the source to the segments, and a pair of brushes connected to the terminals of the primary winding and alternately engageable by the commutator segments; and means for rectifying the secondary output comprising means alternately connecting the terminals of the second winding to the commutator segments whereby a full wave rectified voltage is obtained between the commutator segments and the intermediate secondary tap.

3. In combination with a source of unidirectional voltage, a transformer having primary and secondary windings, each provided with an intermediate tap; means continuously connecting one terminal of the source to the intermediate primary tap; means for alternately connecting the terminals of the primary winding to the other terminal of the source, the last named means comprising a rotating set of electrically connected commutator segments, means continuously joining the last named terminal of the source to the segments, and a pair of brushes connected to the terminals of the primary winding and alternately engageable by the commutator segments, and means for rectifying the secondary output comprising means intermittently connecting the terminals of the secondary winding to those of the primary winding in timed relationship to the alternations of current flow in the primary winding whereby a full wave rectified voltage is obtained between the commutator segments and the intermediate secondary tap.

4. In combination with a source of unidirectional voltage, a transformer having primary and secondary windings, each provided with an intermediate tap; means continuously connecting one terminal of the source to the intermediate primary tap; means for alternately connecting the terminals of the primary winding to the other terminal of the source, the last means comprising a rotating slip ring and a plurality of commutator segments rotating therewith and electrically connected thereto, a brush connected to the last named terminal of the source and continuously engaging the slip ring, and a pair of brushes connected to the terminals of the primary winding and alternately engageable by the commutator segments; and means for rectifying the secondary output comprising a second pair of brushes connected to the terminals of the secondary winding and alternately engageable by the commutator segments, whereby a full wave rectified voltage is obtained between the first mentioned brush and the intermediate secondary tap.

ROLAND DI SABATINO.